US011778680B2

(12) United States Patent
Ryu et al.

(10) Patent No.: US 11,778,680 B2
(45) Date of Patent: Oct. 3, 2023

(54) BEAM FAILURE RECOVERY FOR SECONDARY CELL

(71) Applicant: QUALCOMM Incorporated, San Diego, CA (US)

(72) Inventors: Jung Ho Ryu, Fort Lee, NJ (US); Yan Zhou, San Diego, CA (US); Tianyang Bai, Somerville, NJ (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/002,549

(22) Filed: Aug. 25, 2020

(65) Prior Publication Data

US 2021/0068188 A1 Mar. 4, 2021

Related U.S. Application Data

(60) Provisional application No. 62/891,859, filed on Aug. 26, 2019.

(51) Int. Cl.
*H04W 76/19* (2018.01)
*H04W 24/04* (2009.01)
*H04L 5/00* (2006.01)

(52) U.S. Cl.
CPC ........... *H04W 76/19* (2018.02); *H04L 5/0048* (2013.01); *H04W 24/04* (2013.01)

(58) Field of Classification Search
CPC ..... H04W 76/19; H04W 24/04; H04W 76/15; H04L 5/0048; H04L 5/001; H04L 5/0023; H04B 7/088; H04B 7/0695; H04B 7/0619
See application file for complete search history.

(56) References Cited

U.S. PATENT DOCUMENTS

| 2014/0003387 | A1* | 1/2014 | Lee | H04W 72/0446 370/330 |
| 2018/0138950 | A1* | 5/2018 | Rahman | H04B 7/0417 |
| 2018/0227023 | A1* | 8/2018 | Kim | H04B 7/0617 |
| 2019/0253941 | A1* | 8/2019 | Cirik | H04W 36/0077 |
| 2019/0306801 | A1* | 10/2019 | Zhou | H04W 52/44 |
| 2020/0314722 | A1* | 10/2020 | Kyung | H04W 74/0833 |
| 2020/0322031 | A1* | 10/2020 | You | H04W 72/0466 |
| 2020/0322035 | A1* | 10/2020 | Shi | H04B 7/0639 |

(Continued)

OTHER PUBLICATIONS

U.S. Appl. No. 62/824,458, filed Mar. 27, 2019 (Year: 2019).*

(Continued)

*Primary Examiner* — Ian N Moore
*Assistant Examiner* — Sun Jong Kim
(74) *Attorney, Agent, or Firm* — Norton Rose Fulbright US LLP

(57) ABSTRACT

User equipment (UE) based beam selection for beam failure recovery operations are disclosed. A method of wireless communication includes: identifying a beam failure event associated with a first beam and a secondary cell and transmitting a beam failure recovery request for the secondary cell. The method further includes selecting a second beam for secondary cell communications prior to receiving a response to the beam failure event, and transmitting or receiving a communication to or from the secondary cell using the selected second beam.

23 Claims, 9 Drawing Sheets

(56) References Cited

U.S. PATENT DOCUMENTS

| | | | |
|---|---|---|---|
| 2020/0404638 A1* | 12/2020 | Deogun | H04L 5/0053 |
| 2021/0006456 A1* | 1/2021 | Kim | H04W 74/0833 |
| 2021/0234575 A1* | 7/2021 | Nilsson | H04L 5/0048 |
| 2021/0289372 A1* | 9/2021 | Liu | H04W 72/0413 |
| 2021/0344405 A1* | 11/2021 | Yuan | H04W 80/02 |
| 2022/0006690 A1* | 1/2022 | Matsumura | H04L 41/0672 |

OTHER PUBLICATIONS

"Discussion on multi-beam enhancements" 3GPP TSG-RAN WG1 #98 Praque, CZ, Aug. 26-30, 2019 (R1-1908654) (Year: 2019).*

Partial International Search Report—PCT/US2020/047923—ISA/EPO—dated Nov. 2, 2020.

Huawei, et al., "Beam Failure Recovery for SCell with New Beam Information," 3GPP TSG RAN WG1 Meeting #97, R1-1907533, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728966, 7 pages, Retrieved from the Internet: URL: http://www.3gpp.org/ftp/Meetings%5F3GPP%5FSYNC/RAN1/Docs/R1%2D1907533%2Ezip [retrieved on May 13, 2019] the whole document.

Intel Corporation: "Discussion on Multi-beam Enhancements," 3GPP Draft, 3GPP TSG RAN WG1 #98, R1-1908654, Discussion on Multi-Beam Enhancements, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051765262, 16 pages, Retrieved from the Internet: URL: http://www.3gpp.org/ftp/tsg_ran/WG1_RL1/TSGR1_98/Docs/R1-1908654.zip [retrieved on Aug. 17, 2019] paragraph [0004]; figure 7.

International Search Report and Written Opinion—PCT/US2020/047923—ISA/EPO—dated Jan. 11, 2021.

Convida Wireless: "On Beam Failure Recovery for SCell", 3GPP TSG-RAN WG1 #97, R1-1907466, Reno, USA, May 13-17, 2019, pp. 1-7.

* cited by examiner

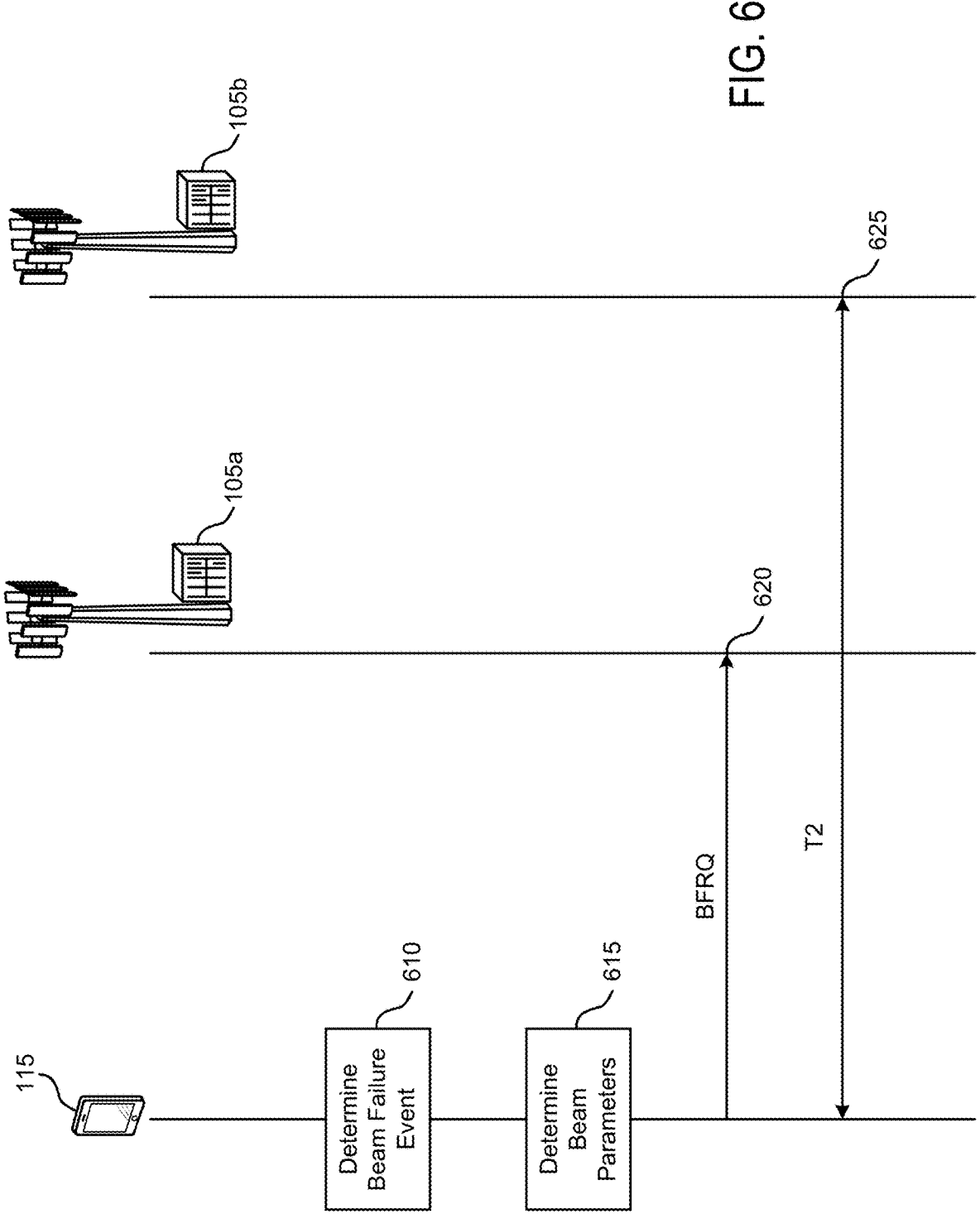

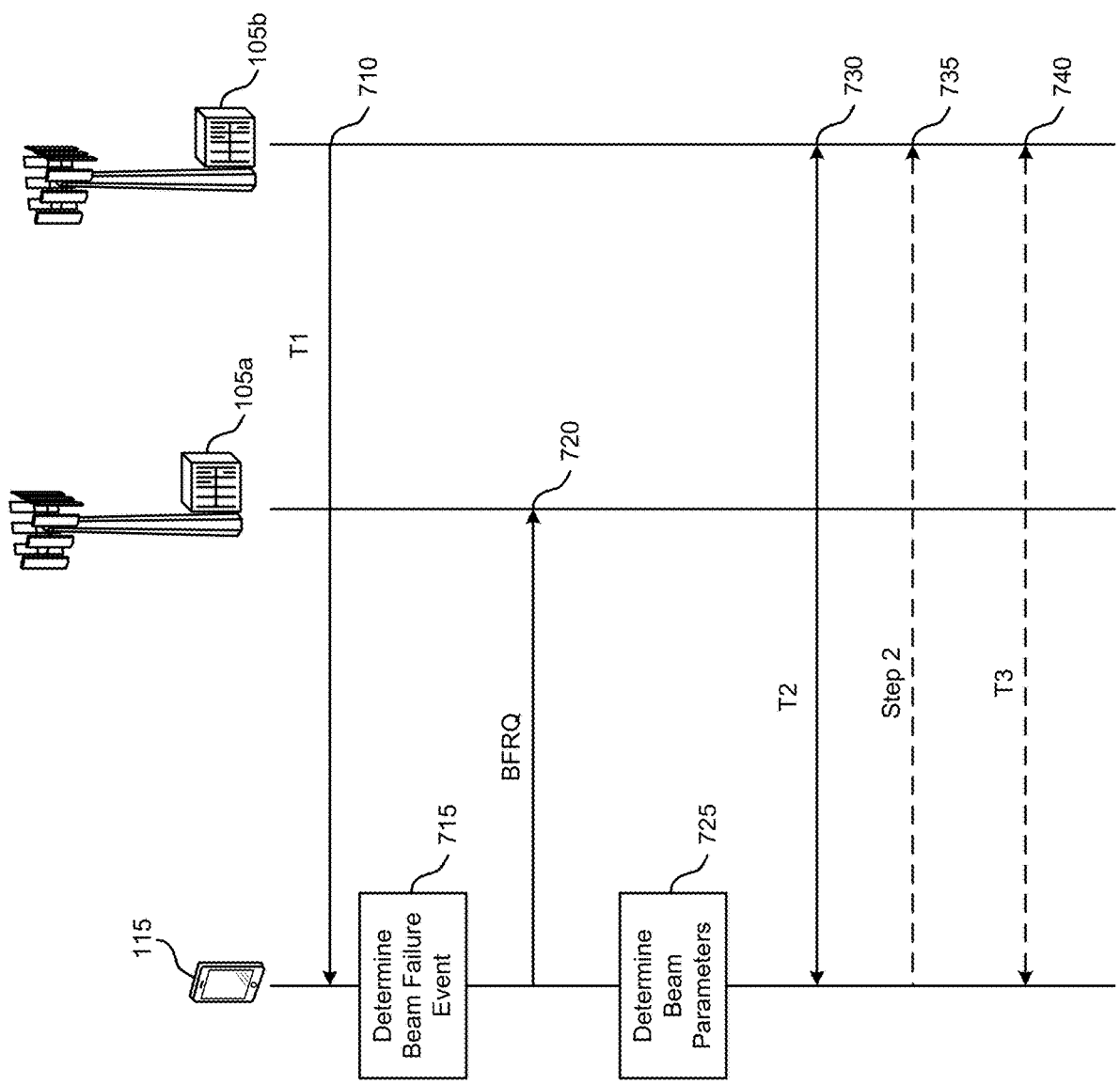

BEAM FAILURE RECOVERY FOR SECONDARY CELL

CROSS-REFERENCE TO RELATED APPLICATIONS

This application claims the benefit of U.S. Provisional Patent Application No. 62/891,859, entitled, "BEAM FAILURE RECOVERY FOR SECONDARY CELL," filed on Aug. 26, 2019, which is expressly incorporated by reference herein in its entirety.

TECHNICAL FIELD

Aspects of the present disclosure relate generally to wireless communication systems, and more particularly, to beam failure recovery operations. Some implementations of the technology discussed below can enable and provide higher reliability and reduced latency.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. A wireless communication network may include a number of base stations or node Bs that can support communication for a number of user equipments (UEs). Communications from other UEs or base stations can cause interference for communications within the wireless communication network. Additionally, movement by the UE may cause signal blockage, interference, and signal degradation. Accordingly, beam failures may occur between a UE and a base station.

Conventionally, beam failure recovery (BFR) and beam failure recovery requests (BFRQ) may be used in wireless communications to facilitate recovery from beam failures, often referred to as beam failure events. Beam failures may occur from failed transmissions, deteriorating channel conditions, poor channel conditions, or a combination thereof. For example, in conventional operations, when the UE is suffering from poor channel conditions, the UE may receive a beam failure indication from lower layers. Conventional beam failure recovery operations include a two-step process on the UE side. Step 1 is to inform the network that a beam failure occurred, and Step 2 is to provide the network with information about a new beam to be used. The UE may request for a recovery by indicating a new SS block or CSI-RS and starting a RACH (random access control channel) procedure. A base station (such as a gNB) may transmit a downlink assignment or an uplink grant on a PDCCH in response. The UE uses the assignment or grant to indicate the beam to end the beam failure recovery. Such procedures may not achieve low latency requirements or constraints for some operating modes, such as URLLC, (such as eURLLC).

BRIEF SUMMARY OF SOME IMPLEMENTATIONS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure relates to improved methods, systems, devices, and apparatuses that support UE based beam selection for beam failure recovery processes, such as beam failure recovery processes associated with a failed beam associated with a secondary cell. During beam failure recovery, a UE may use a new beam for transmission, reception, or both, prior to sending an indication for the new beam to the network and/or receiving confirmation from the network to use the new beam. In this manner, the UE may select and use an improved beam more quickly, thereby reducing (or preventing) radio link failures and dropped calls.

In one aspect of the disclosure, a method of wireless communication includes: identifying a beam failure event associated with a first beam and a secondary cell; transmitting a beam failure recovery request for the secondary cell; selecting a second beam for secondary cell communications prior to receiving a response to the beam failure event; and transmitting or receiving a communication to or from the secondary cell using the selected second beam.

In an additional aspect of the disclosure, an apparatus configured for wireless communication is disclosed. The apparatus includes at least one processor, and a memory coupled to the processor. The processor is configured to identify a beam failure event associated with a first beam and a secondary cell; to transmit a beam failure recovery request for the secondary cell; to select a second beam for secondary cell communications prior to receiving a response to the beam failure event; and to transmit or receive a communication to or from the secondary cell using the selected second beam.

In one aspect of the disclosure, a method of wireless communication includes receiving, from a user equipment (UE) a beam failure recovery request for a beam failure event associated with a first beam and a secondary cell that serves the UE; and transmitting a beam failure recovery response in response to receiving second beam information, the second beam information indicating changed beam communication parameters for the UE in the secondary cell.

In an additional aspect of the disclosure, an apparatus configured for wireless communication is disclosed. The apparatus includes at least one processor, and a memory coupled to the processor. The processor is configured to receive, from a user equipment (UE) a beam failure recovery request for a beam failure event associated with a first beam and a secondary cell that serves the UE; and to transmit a beam failure recovery response in response to receiving second beam information, the second beam information indicating changed beam communication parameters for the UE in the secondary cell.

Other aspects, features, and implementations of the present invention will become apparent to those of ordinary skill in the art, upon reviewing the following description of specific, example implementations of the present invention in conjunction with the accompanying figures. While features of the present invention may be discussed relative to some implementations and figures below, all implementations of the present invention can include one or more of the advantageous features discussed herein. In other words, while one or more implementations may be discussed as having some advantageous features, one or more of such features may also be used in accordance with the various implementations of the invention discussed herein. In similar fashion, while example implementations may be discussed below as device, system, or method implementations the example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 illustrates an example of a process flow that supports beam failure recovery schemes in accordance with aspects of the present disclosure.

FIG. 7 illustrates an example of a process flow that supports beam failure recovery schemes in accordance with aspects of the present disclosure.

DETAILED DESCRIPTION

Figure 1:
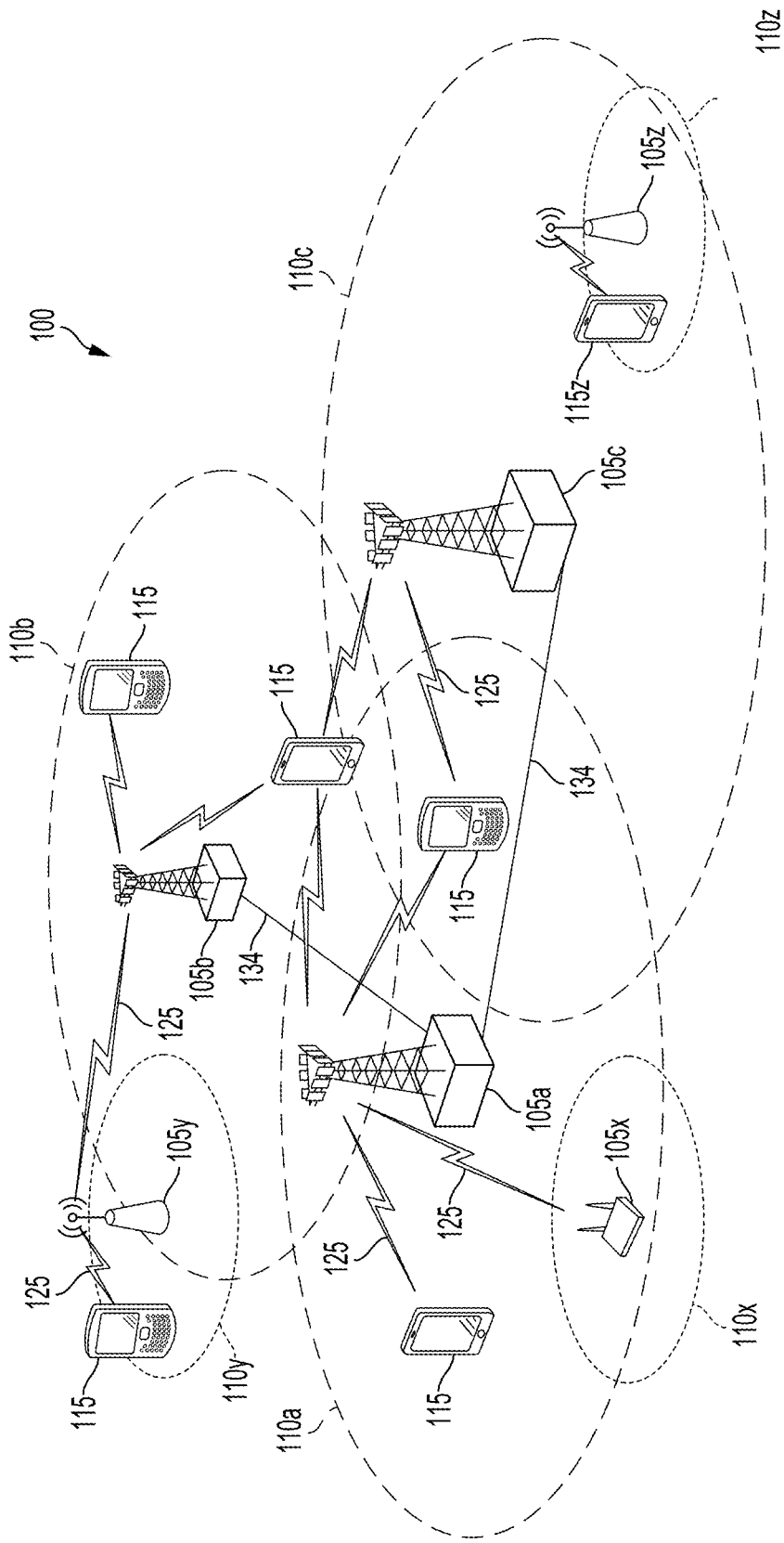
FIG. 1 is a block diagram illustrating details of a wireless communication system according to some implementations of the present disclosure.

This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

The described techniques relate to improved methods, systems, devices, and apparatuses that support beam failure recovery processes and enhancements therefore. Recently, the use of MAC CEs has been proposed for Step 2 of beam failure recovery operations for beam failures for secondary cells. To illustrate, a UE may utilize a MAC CE to transmit beam failure recovery related information, such as to indicate serving cell information (such as secondary serving cell identification information (SCell ID)), new beam information (such as reference signals), bandwidth part information (such as a BWP ID), or a combination thereof. In some implementations, the beam failure recovery enhancements described herein may be used with MAC CE-based beam failure recovery operations and with UE-independent beam failure recovery operations described herein.

Some MAC CE-based beam failure recovery operations described herein may not include a conventional Step 2 operation. For example, MAC CE-based beam failure recovery operations may transmit a MAC CE with or as a Step 1 transmission. To illustrate, a MAC CE may be sent as the beam failure recovery request or with a beam failure recovery request. In such MAC CE-based beam failure recovery operations, a UE may update its beam prior to receiving confirmation from the network in response to Step 2. To illustrate, the UE may use an updated beam before sending the MAC CE, or after sending the MAC CE but before receiving a confirmation or approval message from the network. In this manner, the UE may select and use a stronger beam for reception, transmission or both, thereby reducing (or preventing) communications failures.

Additionally, UE-independent beam failure recovery operations also may not include a conventional Step 2 operation. For example, UE-independent beam failure recovery operations may not transfer beam failure recovery related information to the network. Rather, in some such UE-independent beam failure recovery operations, a UE may update its beam independently from the network. Similarly, the UE may select and use a stronger beam for reception, transmission or both, thereby reducing (or preventing) communications failures.

FIG. 1 is a block diagram illustrating details of a wireless communication system according to some implementations of the present disclosure. FIG. 1 shows wireless network 100 for communication according to some implementations. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by a person having ordinary skill in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may include evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and a gNB subsystem serving the coverage area, depending on the context in which the term is used. In implementations of wireless network 100 herein, gNBs 105 may be associated with a same operator or different operators (e.g., wireless network 100 may include two or more operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. Although a mobile apparatus is commonly referred to as user equipment (UE) in standards and specifications promulgated by the 3rd Generation Partnership Project (3GPP), such apparatus may also be referred to by a person having ordinary skill in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and uplink, or desired transmission between gNBs. Although backhaul communication 134 is illustrated as wired backhaul communications that may occur between gNBs, backhaul communications may additionally or alternatively be provided by wireless communications.

Figure 2:
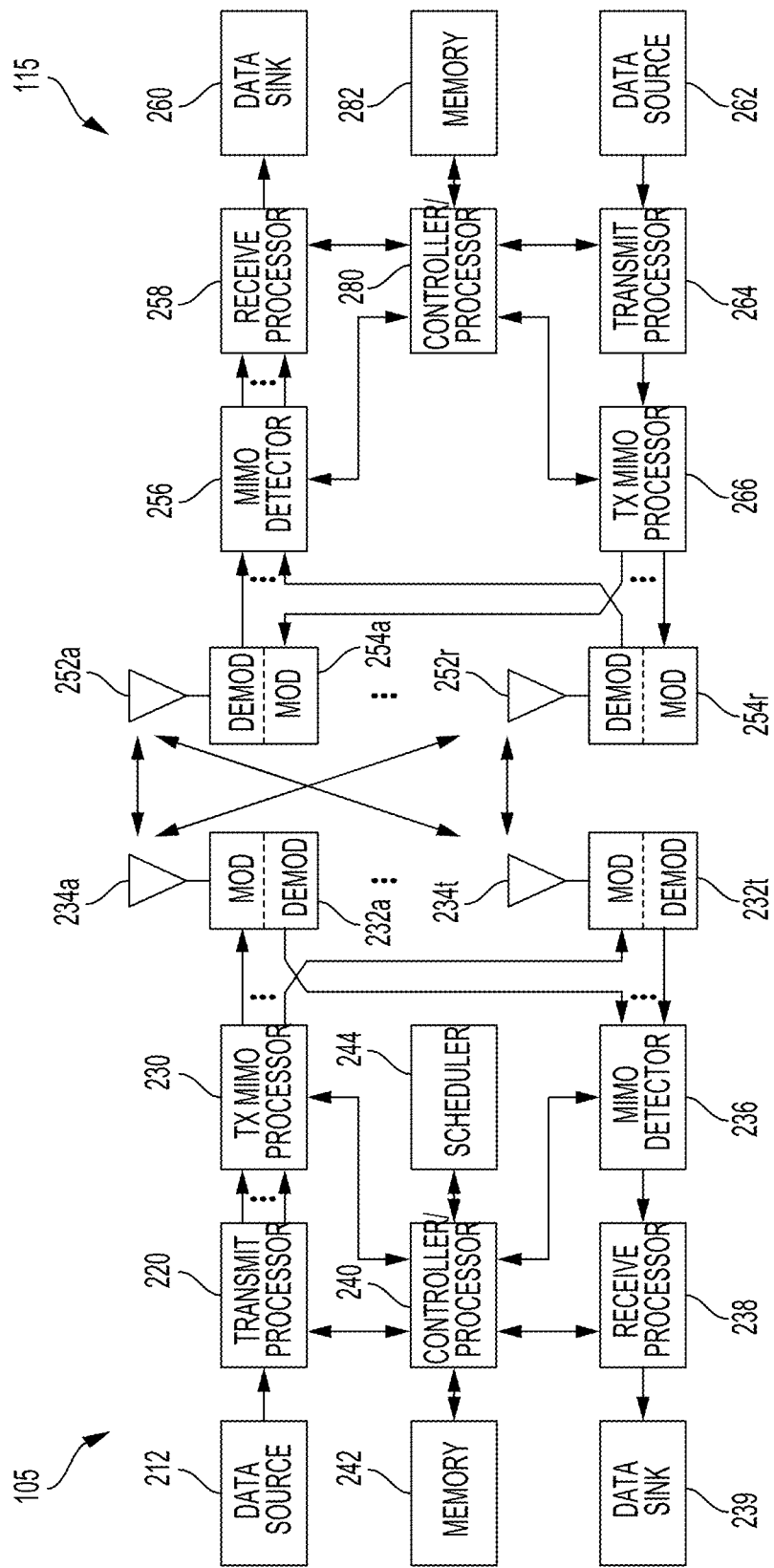
FIG. 2 is a block diagram conceptually illustrating a design of a base station and a UE configured according to some implementations of the present disclosure.

FIG. 2 is a block diagram conceptually illustrating a design of a base station/gNB 105 and a user equipment (UE) 115 configured according to some implementations of the present disclosure. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and other processors and modules at gNB 105 and controllers/processor 280 and other processors and modules at UE 115 may perform or direct the execution of various processes for the techniques described herein, such as to perform or direct the execution illustrated in FIGS. 8 and 9, and other processes for the techniques described herein. Memories 242 and 282 may store data and program codes for gNB 105 and UE 115, respectively. Scheduler 244 may schedule UEs for data transmission on the downlink and uplink.

In 5G networks, control information (for uplink, downlink, or both) may be conveyed in a medium access control (MAC) control element (CE) (that is in a MAC header) of a physical channel packet (that is a data packet or physical channel signal). For example, a UE (such as 115) may transmit a MAC CE in a Physical Uplink Control Channel (PUCCH) or a Physical Uplink Shared Channel (PUSCH), and a base station (such as 105) may transmit a MAC CE in a Physical Downlink Control Channel (PDCCH) or a Physical Downlink Shared Channel (PDSCH), that is in headers thereof. Additionally, MAC CEs can be transmitted in a payload of a physical channel packet. Examples of control information include information for carrier aggregation and cross carrier repetition, such as a component carrier (CC) identified (ID, CC ID).

5G and NR access technologies provide for beam failure recovery (BFR) operations in response to a beam failure or a determination of a beam failure (such as low signal strength). Such conventional beam failure recovery (BFR) operations rely on RACH procedures. Recently, MAC CEs have been proposed to exchange beam failure recovery related control information, such as for Step 2 of conventional BFR operations. However, with the current structure, two-step operations, there is a period of time between Step 1 and confirmation by the network (after Step 2) where it is ambiguous how to transmit and receive information. Accordingly, conventional beam failure recovery operations may be ambiguous as to how to handle such intervening transmissions (that is transmissions that take place after Step 1 and before confirmation by the network). Conventional beam failure recovery operations do not take advantage of and utilize the new beam information until confirmation by the network. Thus, reliability is reduced, latency is increased, and more streamlined beam failure recovery operations are not possible.

Systems and methods described herein are directed to UEs using a new beam after Step 1. The new beam may be used for uplink transmissions, downlink transmissions or both. The new beam may be for all/part of control resource set (CORESET) transmissions, PUCCH transmissions, PUSCH transmissions, PDSCH transmissions, PDCCH transmissions, sounding reference signal (SRS). When MAC CEs are used to transmit Step 2 information, the new beam may be the beam reported in the MAC CE. The new beam may be utilized any time prior to confirmation of the network that Step 2 information was successfully received, such as prior to Step 1, at Step 1, after Step 1, prior to Step 2, or at Step 2.

The systems and methods described herein enable UE based beam management for beam failure recovery operations. Additionally, such system and methods are compatible with recent proposals for MAC CE based Step 2 information exchange and can be used without a Step 2 communication entirely. Such UE based beam management for beam failure recovery operations may enable higher reliability and reduced latency, such as when recovering from beam failure or alleviating poor channel conditions (such as interference blockage, weak signal, etc.). Accordingly, such systems and methods can be utilized for URLLC communications, such as eURLLC.

Figure 3:
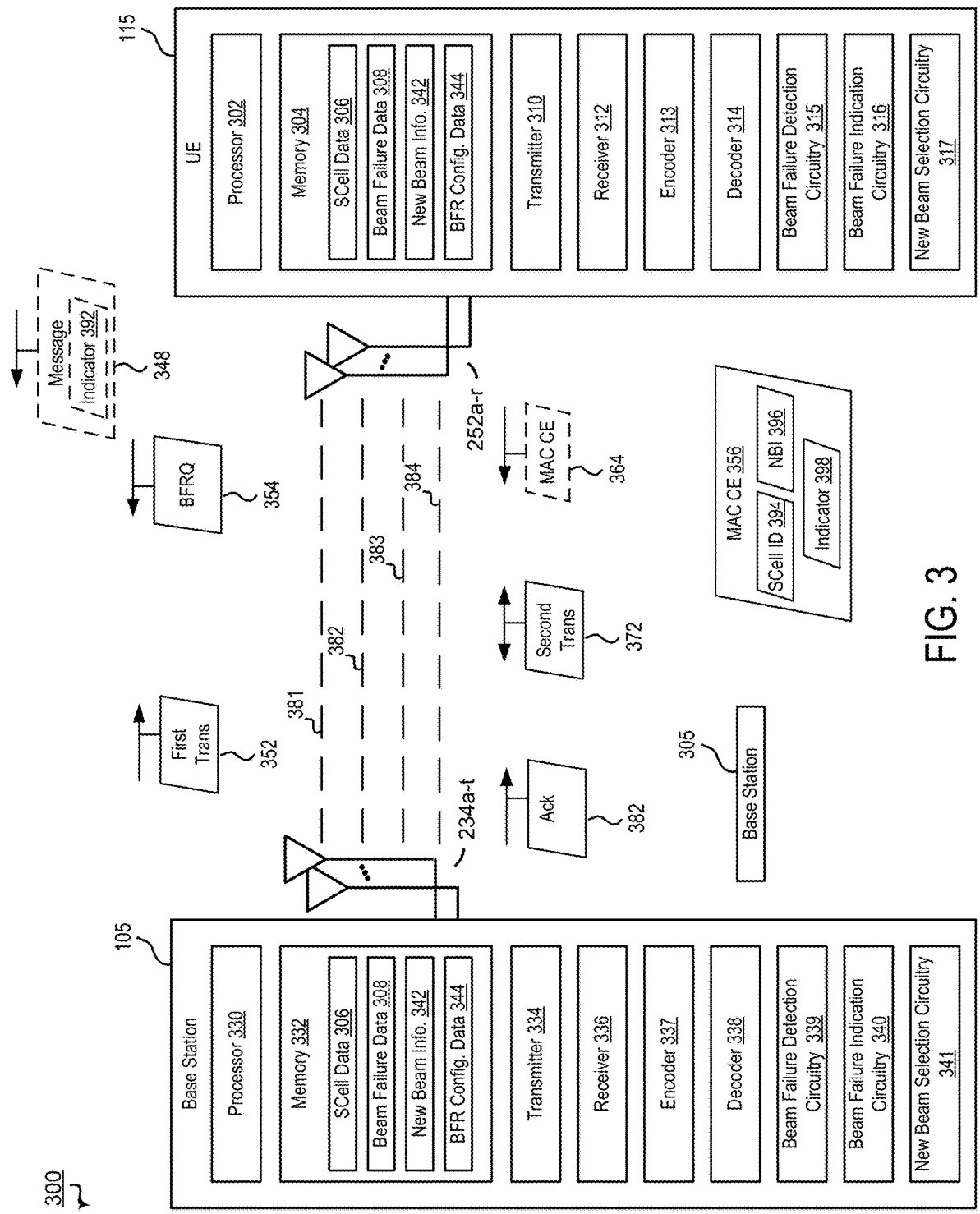
FIG. 3 is a block diagram illustrating an example of a wireless communications system that enables beam failure recovery in accordance with aspects of the present disclosure.

FIG. 3 is a block diagram illustrating an example of a wireless communications system that enables beam failure recovery in accordance with aspects of the present disclosure. FIG. 3 illustrates an example of a wireless communications system 300 that supports UE based beam management in accordance with aspects of the present disclosure. In some examples, wireless communications system 300 may implement aspects of wireless communication system 100. For example, wireless communications system 300 may include UE 115 and base station 105. Although one UE and one base station are illustrated in detail, in other implementations, wireless communications system 300 may include multiple UEs 115, multiple base stations 105, or both, such as second base station 305. UE based beam management may enable reduced overhead and latency when performing BFR operations and thus may increase throughput and reduce latency.

Base stations 105, 305 and UE 115 may be configured to communicate via frequency bands, such as FR1 having a frequency of 450 to 6000 MHz for Sub-6 GHz or FR2 having a frequency of 24250 to 26000 MHz for mm-Wave. It is noted that sub-carrier spacing (SCS) may be equal to 15, 30, 60, or 120 kHz for some data channels. Base stations 105, 305 and UE 115 may be configured to communicate via one or more component carriers (CCs), such as representative first CC 381, second CC 382, third CC 383, and fourth CC 384. Although four CCs are shown, this is for illustration only, more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by dynamic grants or periodic grants (such as configured grants or SPS).

Each CC may have a corresponding configuration, such as configuration parameters/settings. The configuration may include bandwidth, bandwidth part, Hybrid automatic repeat request (HARQ) process, Transmission Configuration Index (TCI) state, reference signal (RS), control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both.

In some implementations, two or more CCs are quasi co-located, such that the CCs have the same beam, the same symbol, or both. Additionally, or alternatively, CCs may be grouped as a set of one or more CCs, such as a cross carrier CORESET. Each CC in a CORESET may have the same cell ID, the same HARQ ID, or both.

In some implementations, control information may be communicated via base station 105 and UE 115, via base station 305 and UE 115, or both. For example, the control information may be communicated using MAC CE transmissions, radio resource control (RRC) transmissions, downlink control information (DCI), transmissions, another transmission, or a combination thereof.

UE 115 includes processor 302, memory 304, transmitter 310, receiver 312, encoder, 313, decoder 314, beam failure detection circuitry 315, beam failure indication circuitry 316, new beam selection circuitry 317, and antennas 252a-r. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store serving cell identification information (such as SCell ID data 306), beam failure data 308, new beam information 342, BFR configuration data 344, or a combination thereof, as further described herein.

The serving cell identification information may include or correspond to an serving cell ID index or a listing of serving cell IDs for serving cells. In the example of FIG. 3, the SCell ID data 306 may include or correspond to an SCell ID index or listing of SCell IDs for secondary serving cells or a secondary serving cell group or groups. The serving cell identification information (such as SCell ID data 306) may be transmitted by MAC CE. Beam failure data 308 may include or correspond to data and thresholds for determining beam failure and when to initiate beam failure recovery operations. For example, beam failure data 308 may include a history of beam failures, a history of beam failure recoveries, beam failure data for recent or current transmissions, channel conditions, signal strength, beam parameters, etc., or a combination thereof.

New beam information 342 may include or correspond to information on settings or parameters for a new transmission or transmissions (uplink, downlink, or both) for a serving cell where the beam failure occurred. New beam information 342 may include beamforming parameters, including amplitude, such as relative amplitude, and phase, as an illustrative, non-limiting example. Additionally, or alternatively, new beam information 342 may information on a main direction of signal propagation, such as angle information. In other implementations, new beam information 342 indicates a reference beam of a beam codebook and the beam codebook stores and indicates the corresponding beam information.

The UE 115 uses the new beam information 342 before conformation from the network. In some such implementation, the UE 115 may begin to use new beam information 342 after determining the new beam information 342, that is unilaterally or independent of confirmation or input from the network, such as base station 105. To illustrate, the UE 115 may begin to use a new beam, that is a second beam different from a first beam which was used during the beam failure event, to transmit information to the network, receive information from the network, or both. Accordingly, the UE 115 may be able to more quickly resolve beam failure events and recover from beam failure.

New beam information 342 may be used for downlink, uplink, or both. In some such implementations where new beam information 342 is used for both uplink and downlink, the new beam information 342 may include separate beam information for uplink and downlink.

In some implementation, new beam information 342 may include reference signals or reference signal information, as illustrative, non-limiting examples. As illustrative, non-limiting examples reference signals, the reference signals may include synchronization signal block (SSB), non-zero power channel state information reference signal identifier (NZP CSI-RS ID), or both may be used. When reference signals are used, the UE may indicate beam settings for the network. To illustrate, which beams the base station or base stations will use to transmit information to the UE 115, to receive information from the UE 115, or both.

BFR configuration data 344 may include or correspond to an indicator which indicates a type or mode of beam failure recovery. For example, BFR configuration data 344 may indicate if beam failure recovery operations are utilizing MAC CE.

In implementations where MAC CEs are used, the BFR configuration data 344 may include MAC CE configuration data or additional MAC CE configuration data may be communicated. MAC CE configuration data may include or correspond to information on a structure or layout of fields of a MAC CE, such as BFR MAC CE.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit data, receive data, or both, via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2. Encoder 313 and decoder 314 may be configured to encode and decode.

Base station 105 includes processor 330, memory 332, transmitter 334, receiver 336, encoder 337, decoder 338, beam failure detection circuitry 339, beam failure indication circuitry 340, new beam selection circuitry 341, and antennas 234a-t. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store SCell ID data 306, beam failure data 308, new beam information 342, BFR configuration data 344, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit data, receive data, or both, via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2. Encoder 337, decoder 338, beam failure detection circuitry 339, beam failure indication circuitry 340, and new beam selection circuitry 341 may include the same functionality as described with reference to encoder 313, decoder 314, beam failure detection circuitry 315, beam failure indication circuitry 316, and new beam selection circuitry 317, respectively. Base station 305 may include the same components as base station 105.

During operation of wireless communications system 300, base station 105 may determine that UE 115 has UE based BFR capability. For example, UE 115 may transmit a first message 348 that includes a capability indicator. As illustrated in FIG. 3, the first message 348 includes an indicator 392. Indicator 392 may indicate a capability, a configuration, or both, for UE based BFR, such as when UE will start to use a new beam after a beam failure event. In some implementations, base station 105 sends control information to indicate to UE 115 when to use a new beam for BFR operations. For example, in some implementations, a message that includes indicator 392 is transmitted by the base station 105.

After transmission of the first message 348 (such as a MAC CE configuration message, such as a RRC message or a DCI), transmissions may be scheduled by the base station 105, the UE 115, or both. Such scheduled transmissions may include shared channel transmissions, such as a PDSCH, a PUSCH, or both. These scheduled transmissions may include or correspond to dynamic or periodic transmissions.

Base station 105 may transmit a first transmission 352 (such as PDSCH) via first CC 381. UE 115 monitors for the transmission 352. UE 115 may receive or not receive the transmission 352 or may or may not successfully decode the transmission 352. In response to a failed transmission or a transmission or channel parameter meeting a condition (such as signal strength lower than a threshold), UE 115 determines a beam failure event for the transmission or serving cell, such as secondary cell. For example, responsive to a failure of first transmission 352 from base station 105 or to channel conditions deteriorating, UE 115 determines a serving Cell ID corresponding to the first transmission 352, base station 105, or both. UE 115 sends a beam failure recovery request (BFRQ), and optionally sends a MAC CE (such as BFR MAC CE).

The BFRQ and MAC CE may be sent in the same transmission, such as transmission 354, or in different transmissions (such as 354 and 364) as illustrated in FIG. 3. When sent with the BFRQ, the MAC CE may be a header or preamble of the transmission (such as 354). When sent separately from the BFRQ, such as in a second, separate transmission 364, the MAC CE may be a header or preamble of the separate transmission or part of the payload of the separate transmission. The MAC CE may be transmitted with other MAC CEs, such as other types of MAC CEs or other BFR MAC CEs. In a particular implementation, the MAC CE is sent via a PUSCH.

The MAC CE may include SCell ID data 306 indicating the secondary cell and may include new beam information 342 indicating new transmission settings and parameters. The MAC CE may have a layout or structure as indicated by MAC CE configuration data. An example MAC CE 356 is illustrated in FIG. 4. MAC CE 356 includes SCell data 394, NBI data 396, and indicator(s) 398. The data 394-398 may include or correspond to data for the beam failure recovery request (such as BFRQ of 354) for a secondary cell associated with the first transmission, the first CC 381, base station 105, or a combination thereof.

In some implementations, MAC CE 356 further includes other information, such as other information for BFR processes or another related process. As an illustrative, non-limiting example, the MAC CE 356 further includes bandwidth part information, such as bandwidth part identification information or active bandwidth part information. The bandwidth part information may indicate an active BWP for a corresponding serving cell (such as base station 105) to use when transmitting new data or retransmitting failed data (such as 372). In the example of FIG. 3, the bandwidth part information includes BWP ID data, which may be optionally included in MAC CE 356. The BWP ID data may be indicated or signaled by indicator(s) 398. For example, the inclusion of BWP ID data in the MAC CE 356 may be indicated or signaled by indicator(s) 398.

The BWP ID indicated by the BWP ID data may be signaled by the base station 115, such as by layer 1 (such as physical layer) signaling or by configuration message (such as RRC configuration message). The BWP ID indicated by the BWP ID data may correspond to a current active BWP ID for the failed serving cell. Alternatively, the BWP ID may correspond to a detected or determined BWP ID by the base station 115. For example, the base station 115 may determine an improved BWP ID based on beam parameters, as compared to the current active BWP ID.

After determining the new beam, which may be indicated by NBI 396, UE 115 may switch or set the new beam to be used for uplink transmissions, downlink transmissions, or both. For example, base station 105 may transmit a second transmission 372 (such as retransmission of the first transmission 352) to the UE 115. UE 115 uses the new beam to receive the second transmissions. As another example, UE 115 uses the new beam to transmit the second transmission 372 to the base station 105. The second transmission 372 may be more likely to be received using the new beam than simply using the old beam which resulted in beam failure until confirmation by the network (such as at 382).

Base station 105 may receive the BFRQ 354 and MAC CE 356 of transmission 364 and may transmit and acknowledgment message 382 indicating receipt of MAC CE 356. Base station 105 may perform BFR operations based on the information of the MAC CE 356. Base station 105 may transmit a new transmission (after second transmission 372 or acknowledgment message 382) using the new beam information of the MAC CE (such as NBI 396 of MAC CE 356). The new transmission may be more likely to be received using the new beam indicated by NBI 396 than simply retransmitting with the same failed beam information and can overcome blockage, interference, or both, on a particular channel or for particular settings.

In some implementations, base station 105 may include or correspond to a secondary serving cell of or for UE 115 and second base station 305 may include or correspond to a primary serving cell (PCell) of or for UE 115. In such implementations, the MAC CE 356 may include data for one serving cell (such as one secondary serving cell (SCell), such as base station 105). In other implementations, both base stations 105, 305 may include or correspond to a secondary serving cell (SCell) of or for UE 115. In such implementations, if beam failure recovery is detected for both secondary serving cell (SCells), the MAC CE 356 may include data for multiple serving cells (such as both secondary serving cells (SCells), such as base stations 105 and 305).

Thus, FIG. 3 describes using UE based beam implementation BFR operations. Using UE based beam implementation BFR operations enables a network to reduce latency and overhead and improve reliability when recovering from beam failure. Improving performance when recovering from beam failures may improve throughput for communications on the network and enable use of mm wave frequency ranges and URLLC modes.

Figure 4B:
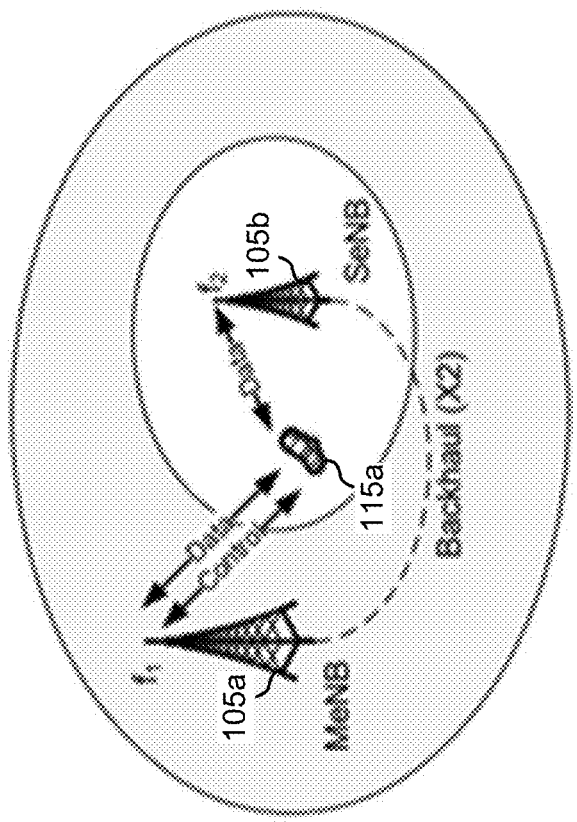
FIGS. 4A and 4B are diagrams illustrating examples different operating modes.
Figure 4A:
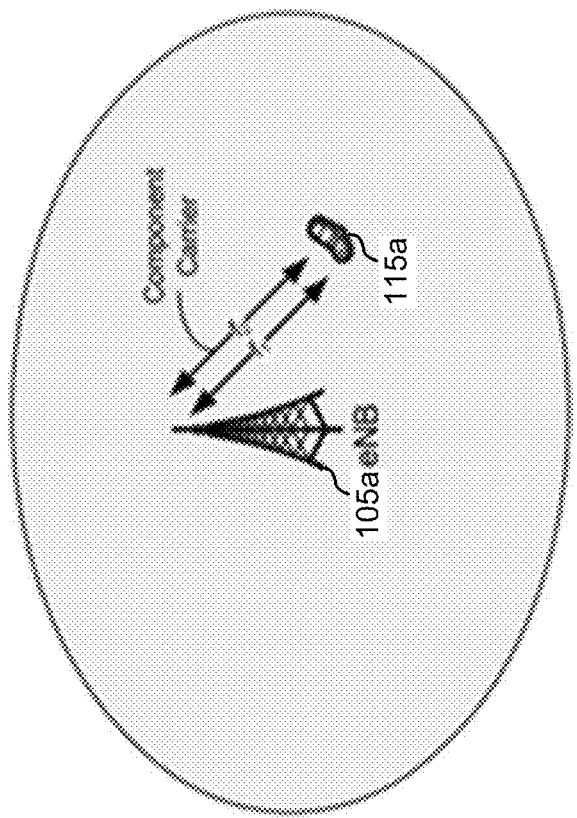

Referring to FIGS. 4A and 4B, examples different operating modes are illustrated. FIG. 4A corresponds to a diagram for carrier aggregation and FIG. 4B corresponds to a diagram for dual connectivity. In FIG. 4A, a diagram illustrating carrier aggregation is illustrated. FIG. 4A depicts one base station 105a which communicates with UE 115a. Base station 105a may transmit data and control information; base station 105a may transmit (and receive) information using different equipment or settings (such as different frequencies). In carrier aggregation, the network, that is base station 105a, includes primary and secondary cells, such as primary and secondary serving cells.

In FIG. 4B, a diagram illustrating dual connectivity is illustrated. FIG. 4B depicts two base stations, 105a and 105b which communicate with UE 115a. UE 115a communicates data with both base stations and control information with one base station, main base station 105a. In dual connectivity, the network includes primary and secondary cell groups, as opposed to primary and secondary cells in carrier aggregation. Each group, primary or secondary, may include primary and secondary cells. Thus, such setups where each group includes primary and secondary cells may utilize both carrier aggregation and dual connectivity.

Figure 5:
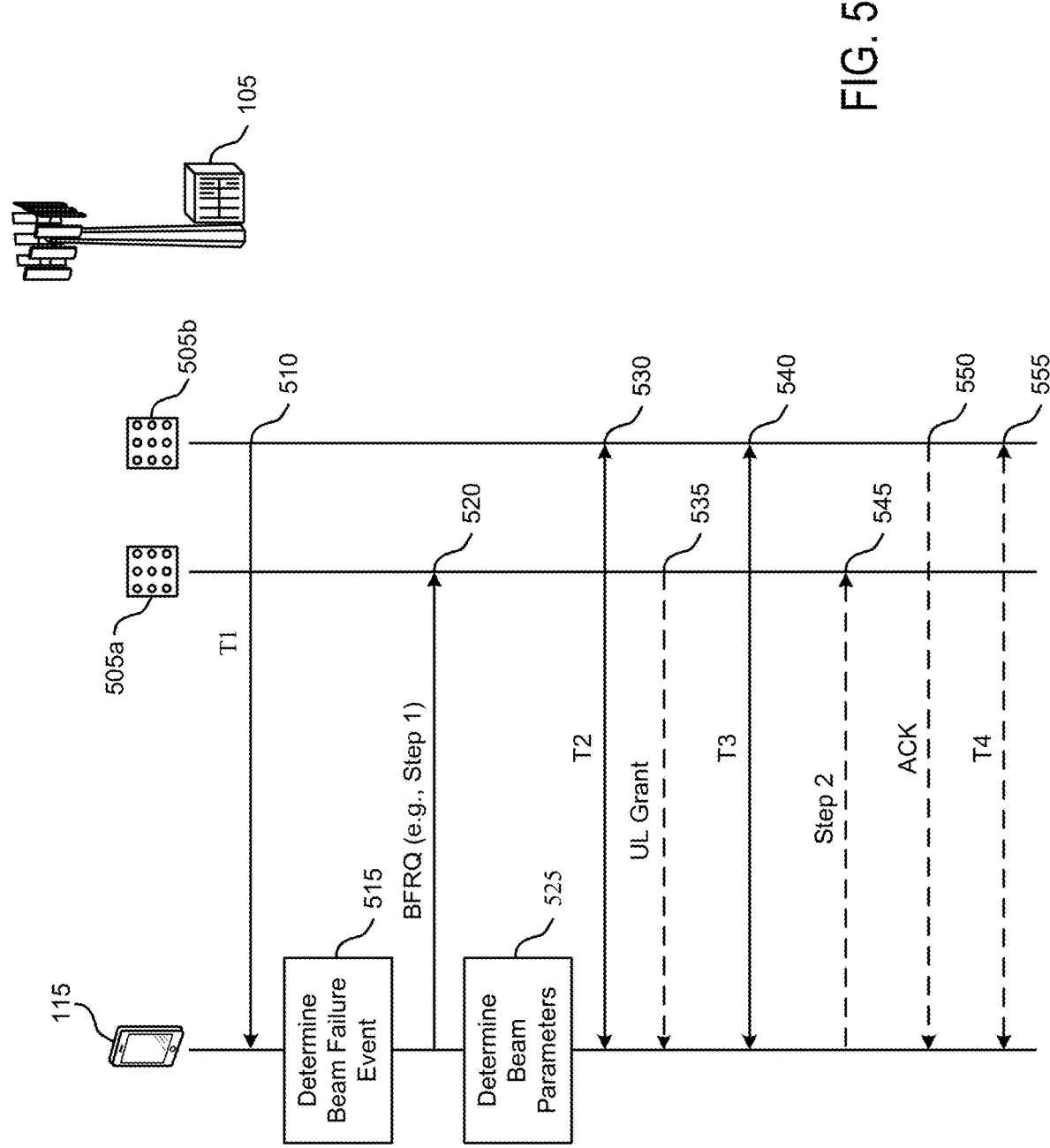
FIG. 5 illustrates an example of a process flow that supports beam failure recovery schemes in accordance with aspects of the present disclosure.

FIG. 5 illustrates an example of a process flow 500 that supports beam failure recovery schemes in accordance with aspects of the present disclosure. In some examples, process flow 500 may implement aspects of a wireless communications system 100 or 300. For example, a base station 105 and UE 115 may perform one or more of the processes described with reference to process flow 500. Base station 105 may communicate with UE 115 by transmitting and receiving signals through TRPs 505a and 505b. In other cases, TRPs 505a and 505b may correspond to different base stations 105. Alternative examples of the following may be implemented, where some steps are performed in a different order than described or are not performed at all. In some cases, steps may include additional features not mentioned below, or further steps may be added.

At 510, base station 105 transmits a first transmission (T1). As illustrated in the example of FIG. 5, second TRP 505b of base station 105 transmits the first transmission (T1) using a first beam and UE 115 receives the first transmission (T1) using a corresponding first beam. Second TRP 505b of base station 105 may include or correspond to a secondary cell of the network, UE 115, or both.

At 515, UE 115 determines a beam failure event. For example, the UE 115 determines a failed downlink transmission (such as T1), deteriorating channel parameters (such as a change in channel parameters above a threshold), or low channel parameters (such as channel parameters below a threshold). Additionally, or alternatively, the UE 115 determines to perform a beam failure recovery. As illustrated in the example of FIG. 5, UE 115 determines a beam failure event for the secondary cell, second TRP 505b of base station 105.

At 520, UE 115 transmits a beam failure recovery request (BFRQ) to the network. In the example of FIG. 5, UE 115 transmits a BFRQ to the primary cell, first TRP 505a of base station 105. In some implementations, the BFRQ is, indicates, or includes a scheduling request, such as a bit or flag. The scheduling request is to request an uplink resource for sending beam failure recovery information, such as Step 2 information or new beam information via a MAC CE.

At 525, UE 115 may determine beam parameters, such as new beam information (for example NBI 396) for the cell or cell group where the beam failure event occurred. To illustrate, UE 115 may determine beamforming information, reference signal information, or both. Reference signal information may be used for network beamforming. UE 115 may determine beam parameters based on a previous beam or beams, channel condition information, or a combination thereof.

At 530, UE 115 may transmit or receive a second transmission (T2). For example, the network may transmit a transmission to UE 115. As illustrated in FIG. 5, a secondary cell of the network, second TRP 505b of base station 105, transmits second transmission (T2) to the UE prior to UE 115 transmitting beam failure recovery information. The UE 115 may use the new beam, a second beam different from the first beam which failed for the first transmission, to transmit or received the second transmission. Additionally, in the example of FIG. 5, the second transmission is also prior to the network sending an uplink grant related to the beam failure recovery at 535.

At 535, UE 115 may receive an uplink grant or instance. For example, the network may transmit a transmission to UE 115, such as a DCI. As illustrated in FIG. 5, a primary cell of the network, first TRP 505a of base station 105, transmits an indication for an uplink grant to the UE 115 using a DCI. The DCI may schedule upcoming PDSCH transmissions and may include other control information.

At 540, UE 115 may optionally transmit or receive a third transmission (T3). For example, the network may transmit a transmission to UE 115. As illustrated in FIG. 5, a secondary cell of the network, second TRP 505b of base station 105, transmits third transmission (T3) to the UE prior to UE 115 transmitting beam failure recovery information at 545 but after the network sends an uplink grant related to the beam failure recovery at 535. The UE 115 may use the new beam, a second beam different from the first beam which failed for the first transmission, to transmit or received the third transmission.

Transmissions that occur after 520 but prior to sending Step 2 information (that is 545) or in the absence of sending Step 2 information, may be ambiguous as to what beam is to be used. The transmissions, such as second and third transmissions, may be scheduled prior to detection of the beam failure event, prior to the transmission of the BFRQ at 520, or both, but occur after such events and before confirmation of new beam information, completion of beam failure recovery operations, or both.

At 545, UE 115 optionally transmits beam failure recovery information to the network, referred to as Step 2 of the beam failure recovery process. As illustrated in FIG. 5, UE 115 transmits beam failure recovery information to the primary cell, first TRP 505a of base station 105. The beam failure recovery information may be included in a MAC CE, and may include new beam information and serving cell identification information. For example, the serving/secondary cell identification information identifies the secondary cell, second TRP 505b in the example of FIG. 5. Thus, the primary cell, first TRP 505a of base station 105, knows in which cell (or cell group) the beam failure occurred and for which cell (or cell group) is the new beam information for. In other implementations, such as where secondary cell is another base station or part of another cell group, the primary cell base station 105 may send or forward the new beam information to the a cell identified by the serving/secondary cell identification information.

At 550, UE 115 optionally receives an acknowledgement message from the network. For example, the network may transmit an acknowledgement message to UE 115 to indicate completion of the beam failure recovery operation, receipt of new beam information, or both. As illustrated in FIG. 5, a secondary cell of the network, second TRP 505b of base station 105, transmits a positive acknowledgement message to UE 115.

At 555, UE 115 may transmit or receive a fourth transmission (T4). For example, the network may transmit a transmission to UE 115. As illustrated in FIG. 5, a secondary cell of the network, second TRP 505b of base station 105, transmits fourth transmission (T4) to the UE 115 after confirmation of receipt of beam failure recovery information in Step 2. Additionally, in the example of FIG. 5, the second transmission is also prior to the network sending an uplink grant related to the beam failure recovery.

FIG. 6 illustrates an example of a process flow 600 that supports beam failure recovery schemes in accordance with aspects of the present disclosure. In some examples, process flow 600 may implement aspects of a wireless communications system 100 or 300. For example, a base station 105 and UE 115, such as base stations 105a and 105b and UE 115, may perform one or more of the processes described with reference to process flow 600. Alternative examples of the following may be implemented, where some steps are performed in a different order than described or are not performed at all. In some cases, steps may include additional features not mentioned below, or further steps may be added.

At 610, UE 115 determines a beam failure event. For example, the UE 115 determines a failed downlink transmission, deteriorating channel parameters (such as a change in channel parameters above a threshold), or low channel parameters (such as channel parameters below a threshold). Additionally, or alternatively, the UE 115 determines to perform a beam failure recovery.

At 615, UE 115 may determine beam parameters, such as new beam information (for example NBI 396) for the cell or cell group where the beam failure event occurred. To illustrate, UE 115 may determine beamforming information, reference signal information, or both. Reference signal information may be used for network beamforming. UE 115 may determine beam parameters based on a previous beam or beams, channel condition information, or a combination thereof.

At 620, UE 115 transmits a beam failure recovery request (BFRQ) to the network. In the example of FIG. 6, UE 115 transmits a BFRQ to the primary cells of a secondary cell group, base station 105a. In some implementations, the BFRQ is, indicates, or includes a scheduling request, such as a bit or flag. The scheduling request is to request an uplink resource for sending beam failure recovery information, such as step 2 information or new beam information via a MAC CE.

At 625, UE 115 may transmit or receive a second transmission (T2). For example, the network may transmit a transmission to UE 115. As illustrated in FIG. 6, a secondary cell of the secondary cell group, base station 105b, transmits second transmission (T2) to the UE 115. UE 115 may use the new beam, a second beam different from the first beam which failed for the first transmission, to transmit or received the second transmission. In the example implementation of FIG. 6, UE 115 does not transmit Step 2 information to the network.

FIG. 7 illustrates an example of a process flow 700 that supports beam failure recovery schemes in accordance with aspects of the present disclosure. In some examples, process flow 700 may implement aspects of a wireless communications system 100 or 300. For example, a base station 105 and UE 115, such as base stations 105*a* and 105*b* and UE 115, may perform one or more of the processes described with reference to process flow 700. Alternative examples of the following may be implemented, where some steps are performed in a different order than described or are not performed at all. In some cases, steps may include additional features not mentioned below, or further steps may be added.

At 710, base station 105*b* transmits a first transmission (T1) to UE. As illustrated in the example of FIG. 7, second base station 105*b* transmits the first transmission (T1) using a first beam and UE 115 receives the first transmission (T1) using a corresponding first beam. Second base station 105*b* may include or correspond to a secondary cell group of the network, UE 115, or both, such as a secondary cell of the secondary cell group.

At 715, UE 115 determines a beam failure event. For example, the UE 115 determines a failed downlink transmission, deteriorating channel parameters (such as a change in channel parameters above a threshold), or low channel parameters (such as channel parameters below a threshold). Additionally, or alternatively, the UE 115 determines to perform a beam failure recovery.

At 720, UE 115 transmits a beam failure recovery request (BFRQ) to the network. In the example of FIG. 7, UE 115 transmits a BFRQ to the primary cell (such as of the primary cell group or secondary cell group), base station 105*a*. In some implementations, the BFRQ is, indicates, or includes a scheduling request, such as a bit or flag. The scheduling request is to request an uplink resource for sending beam failure recovery information, such as Step 2 information or new beam information via a MAC CE.

At 725, UE 115 may determine beam parameters, such as new beam information (for example NBI 396) for the cell or cell group where the beam failure event occurred. To illustrate, UE 115 may determine beamforming information, reference signal information, or both. Reference signal information may be used for network beamforming. UE 115 may determine beam parameters based on a previous beam or beams, channel condition information, or a combination thereof.

At 730, UE 115 may transmit or receive a second transmission (T2). For example, the network may transmit a transmission to UE 115. As illustrated in FIG. 7, a secondary cell of the secondary cell group, base station 105*b*, transmits second transmission (T2) to the UE 115 prior to UE 115 transmitting beam failure recovery information (such as in Step 2 at 735). UE 115 may use the new beam, a second beam different from the first beam which failed for the first transmission, to transmit or received the second transmission.

At 735, UE 115 optionally transmits beam failure recovery information to the network, referred to as Step 2 of the beam failure recovery process. As illustrated in FIG. 7, UE 115 transmits beam failure recovery information to the secondary cell, base station 105*b*. In such implementations, the beam failure recovery information may be included in a MAC CE, and may include new beam information. The MAC CE, or other message, may not include secondary cell identification information in some such implementations. As the MAC CE, or other message, is being sent to the cell or cell group, such as the secondary cell/cell group, where the beam failure occurred, the secondary cell identification information may not be used to identify where the beam failure event occurred.

Alternatively, UE 115 transmits beam failure recovery information to the primary cell, base station 105*a*, similar to FIG. 5. In such implementations, the beam failure recovery information may be included in a MAC CE, and may include new beam information and secondary cell identification information. To illustrate, the secondary cell identification information is used by the primary cell to determine where to send or forward the new beam information or what beam to change. In the example of FIG. 7, the network does not send an uplink grant related to the beam failure recovery to schedule Step 2.

At 740, UE 115 may transmit or receive a third transmission (T3). For example, the network may transmit a transmission to UE 115 after transmission of step 2 information at 735. As illustrated in FIG. 7, a secondary cell, base station 105*b*, of the network transmits third transmission (T3) to UE 115 after transmitting beam failure recovery information. Although three example implementations are illustrated in FIGS. 5-7, additional implementations may include features or transmissions from one or more of the examples.

Figures 8, 9:
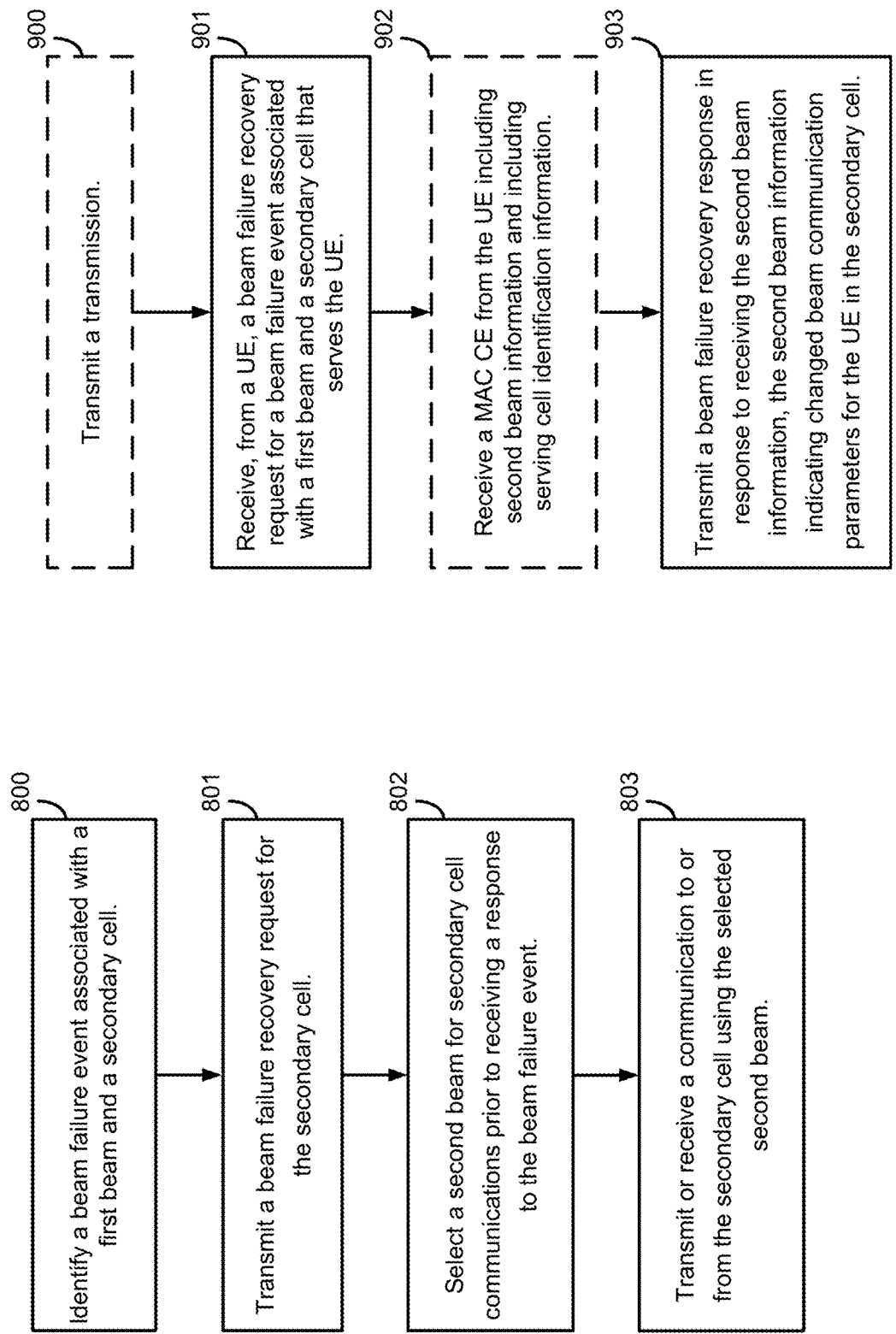
FIG. 8 is a block diagram illustrating example blocks executed by a UE configured according to an aspect of the present disclosure.
FIG. 9 is a block diagram illustrating example blocks executed by a base station configured according to an aspect of the present disclosure.
Figures 10, 11:
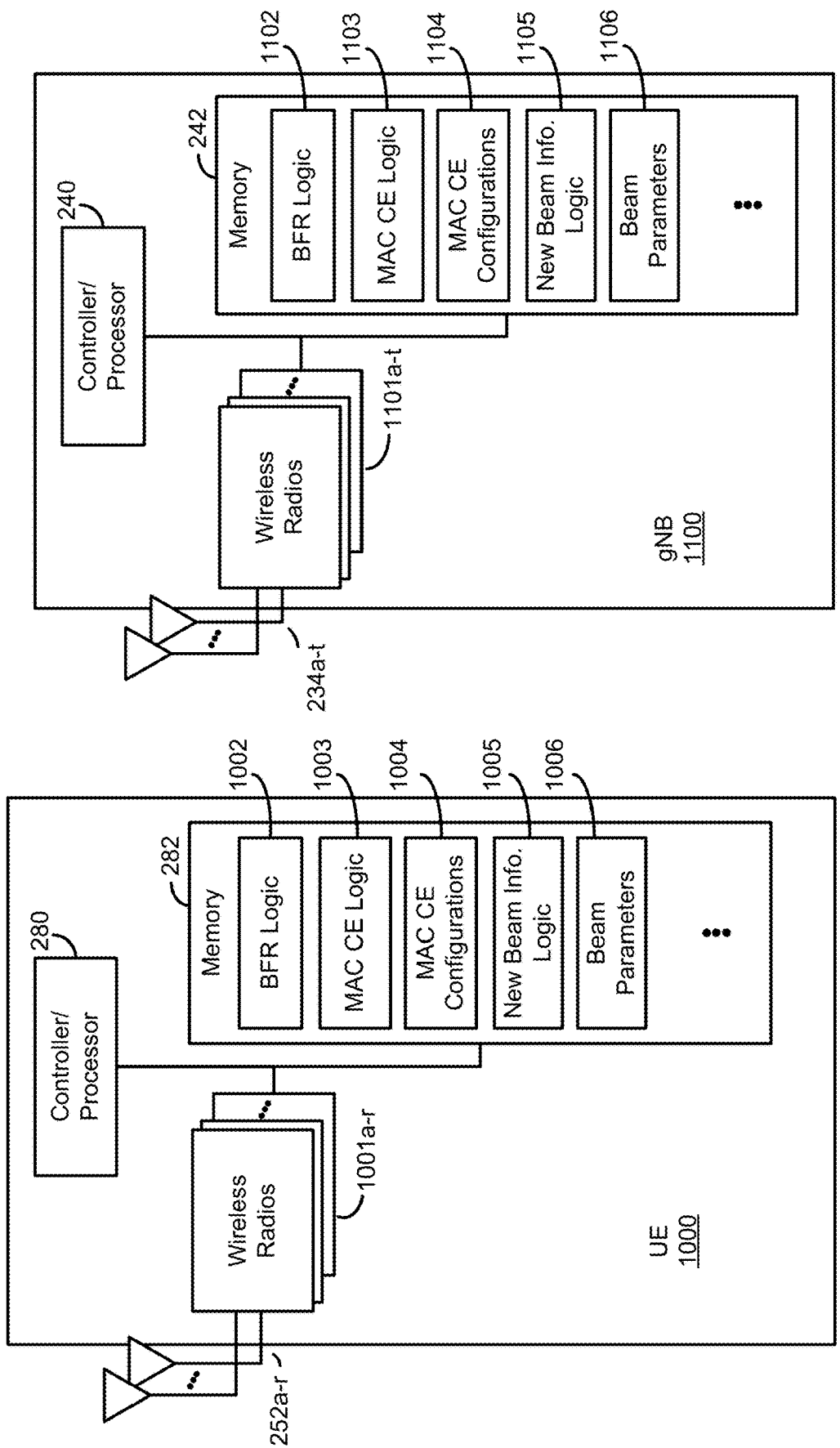
FIG. 10 is a block diagram conceptually illustrating a design of a UE according to some implementations of the present disclosure.
FIG. 11 is a block diagram conceptually illustrating a design of a base station configured according to some implementations of the present disclosure.

FIG. 8 is a block diagram illustrating example blocks executed by a UE configured according to an aspect of the present disclosure. The example blocks will also be described with respect to UE 1000 as illustrated in FIG. 10. FIG. 10 is a block diagram illustrating UE 1000 configured according to one aspect of the present disclosure. UE 1000 includes the structure, hardware, and components as illustrated for UE 1000 of FIG. 2. For example, UE 1000 includes controller/processor 280, which operates to execute logic or computer instructions stored in memory 282, as well as controlling the components of UE 1000 that provide the features and functionality of UE 1000. UE 1000, under control of controller/processor 280, transmits and receives signals via wireless radios 1001*a-r* and antennas 252*a-r*. Wireless radios 1001*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 10, memory 282 stores Beam Failure Recovery (BFR) logic 1002, MAC CE logic 1003, MAC CE configuration data 1004, new beam information logic 1005, and beam parameters 1006.

At block 800, a mobile communication device, such as a UE, identifies a beam failure event associated with a first beam and a secondary cell. A UE, such as UE 1000, may execute, under control of controller/processor 280, Beam Failure Recovery logic 1002, stored in memory 282. The execution environment of Beam Failure Recovery logic 1002 provides the functionality for UE 1000 to define and perform the Beam Failure Recovery procedures. The execution environment of Beam Failure Recovery logic 1002 defines the different Beam Failure Recovery processes, such as determining a Beam Failure event, determining whether to perform a Beam Failure Recovery, determining a Beam Failure Recovery mode, determining a serving cell ID for the Beam Failure Event/Recovery, determining a MAC CE configuration, signaling a MAC CE configuration, a BFR MAC CE capability, etc., or a combination thereof. UE 1000 may monitor a medium for a downlink message (such as a DCI or PDSCH) via antennas 252*a-r* and wireless radios 1001*a-r*. UE 1000 may determine a failed transmission, when channel conditions are poor, when channel conditions are deteriorating, or a combination thereof. UE 1000 may optionally send an acknowledgement message responsive to the downlink message to indicate failed reception, decoding of the downlink message, or both.

In some implementations, the downlink message is a dynamic grant. In other implementations, the downlink message is a periodic grant. The UE 1000 may schedule or determine a schedule for upcoming the downlink transmission (or transmission) based on the dynamic grant (or periodic grant), and may monitor for and receive such downlink transmission(s) using antennas 252*a-r* and wireless radios 1001*a-r*.

At block 801, the UE 1000 transmits a beam failure recovery request for the secondary cell. The UE 1000 transmits an uplink transmission including a BFRQ (such as BFRQ of 354) via wireless radios 1001*a-r* and antennas 252*a-r*. The execution environment of Beam Failure Recovery logic 1002 provides UE 1000 the functionalities described with respect to the various aspects of the present disclosure, such as determining whether to send a BFRQ, generating a BFRQ, and transmitting the BFRQ. To illustrate, within the execution environment of Beam Failure Recovery logic 1002, UE 1000, under control of controller/processor 280, may determine that a beam failure recovery operation has been initiated and may generate a corresponding BFRQ, which is transmitted via wireless radios 1001*a-r* and antennas 252*a-r*.

At block 802, the UE 1000 selects a second beam for secondary cell communications prior to receiving a response to the beam failure event. The UE 1000 determines and selects a second beam to use for uplink communications, downlink communications, or both. The response to the beam failure event may include a beam failure recovery response or a beam activation command transmitted in response to a MAC CE which includes the information about the second beam (e.g., second beam information). The execution environment of Beam Failure Recovery logic 1002 provides UE 1000 the functionalities described with respect to the various aspects of the present disclosure, such as determining alternative beams to use. To illustrate, within the execution environment of Beam Failure Recovery logic 1002, UE 1000, under control of controller/processor 280, may determine a second beam to use. The UE 1000 may further determine beamforming parameters for the second beam and an indicator for the second beam (e.g., a reference signal or RS ID).

At block 803, the UE 1000 transmits or receives a communication to or from the secondary cell using the selected second beam. The UE 1000 transmits or receives a communication via wireless radios 1001*a-r* and antennas 252*a-r* with a second beam that is different from a first failed beam of the beam failure event. The communication may occur before sending a BFR MAC CE, before a step 2 transmission of the BFR, before confirmation or acknowledgment by the network of the new beam information from the BFR MAC CE, or a combination thereof. Accordingly, UE 1000 may begin using the new beam unilaterally or independent of the network and more quickly as compared to conventional beam failure recovery operations. Thus, the UE 1000 may resolve and recover from beam failure event more quickly, may utilize less resources to do so, may reduce or eliminate the current ambiguous period for which beam to use during beam failure recovery operations.

The execution environment of Beam Failure Recovery logic 1002 provides UE 1000 the functionalities described with respect to the various aspects of the present disclosure, such as determining an intended CC ID. To illustrate, within the execution environment of Beam Failure Recovery logic 1002, UE 1000, under control of controller/processor 280, may determine a configuration of a new beam for transmission, reception or both. The Beam Failure Recovery logic 1002, UE 1000, under control of controller/processor 280, may determine the parameters and settings for the new beam, such as new beam information. After generation of the MAC CE, UE 1000 transmits or receives the transmission using antennas 252*a-r* and wireless radios 1001*a-r* and the new beam indicated by the new beam information.

The UE 1000 may execute additional blocks (or the UE 1000 may be configured further perform additional operations) in other implementations. For example, UE 1000 transmits a BFR MAC CE (such as 356) via wireless radios 1001*a-r* and antennas 252*a-r* in some implementations after 802. To illustrate, a second uplink transmission may include the MAC CE as a header (such as MAC header) or preamble for an accompanying physical layer signal (such as symbol or waveform) or the second uplink transmission may include the MAC CE as payload data, that is indicated by the physical layer signal.

As other examples, the UE 1000 may attempt to decode the transmission, determine a power level of the transmission, compared the determined power level of the transmission to a power level threshold, determine a beam failure for the transmission, other transmissions (such as other serving cells), or a combination thereof. In some implementations, the UE may transmit or receive a capabilities message, a configuration message, or a mode message. Additionally or alternatively, the MAC CE may further include BWP ID data. In some such BWP implementations, a MAC CE may not include new beam information.

The UE 115 may execute additional blocks (or the UE 115 may be configured further perform additional operations) in other implementations. For example, the UE 115 may perform one or more operations described above. As another example, the UE 115 may perform one or more aspects described below.

In a first aspect, the UE 115 transmits a medium access control (MAC) control element (CE) including information about the second beam after transmitting the beam failure recovery request.

In a second aspect, alone or in combination with one or more of the above aspects, the communication is transmitted or received prior to receiving a beam failure recovery response or a beam activation command in response to the MAC CE, and wherein the MAC CE further includes identification information of the secondary cell associated with the beam failure event.

In a third aspect, alone or in combination with one or more of the above aspects, the information about the second beam comprises reference signal information which corresponds to the second beam.

In a fourth aspect, alone or in combination with one or more of the above aspects, the reference signal information includes a synchronization signal block (SSB) identifier or a channel state information reference signal (CSI-RS) identifier.

In a fifth aspect, alone or in combination with one or more of the above aspects, the beam failure recovery request comprises a medium access control (MAC) control element (CE) including information about the second beam.

In a sixth aspect, alone or in combination with one or more of the above aspects, the UE 115 determines the second beam responsive to determining the beam failure event, and switches beam parameter settings to the second beam in response to selecting the second beam.

In a seventh aspect, alone or in combination with one or more of the above aspects, the beam failure event occurred in the secondary cell and the communication is received from the secondary cell, and wherein the beam failure recovery request is transmitted to a primary cell or the secondary cell.

In an eighth aspect, alone or in combination with one or more of the above aspects, the communication is a control channel transmission or a data channel transmission, and wherein the second beam is used for control channel transmissions, data channel transmissions, or a combination thereof, associated with the secondary cell.

In a ninth aspect, alone or in combination with one or more of the above aspects, the second beam is used for control resource set (CORESET) transmissions, Physical Uplink Control Channel (PUCCH) transmissions, Physical Uplink Shared Channel (PUSCH) transmissions, Physical Downlink Shared Channel (PDSCH) transmissions, Physical Downlink Control Channel (PDCCH) transmissions, sounding reference signal (SRS) transmissions, or a combination thereof, for the secondary cell.

In a tenth aspect, alone or in combination with one or more of the above aspects, the UE 115 determines second beam information of the second beam, and wherein the second beam information includes beamforming information associated with the second beam.

In an eleventh aspect, alone or in combination with one or more of the above aspects, the beamforming information includes phase information and amplitude information associated with antenna elements of an antenna array that generates the second beam, or includes information on a main direction of signal propagation.

In a twelfth aspect, alone or in combination with one or more of the above aspects, the beamforming information identifies a particular beam in a codebook that includes a plurality of beams.

In a thirteenth aspect, alone or in combination with one or more of the above aspects, the beam failure recovery request is transmitted to a primary cell.

In a fourteenth aspect, alone or in combination with one or more of the above aspects, the beam failure recovery request is transmitted to the secondary cell.

In a fifteenth aspect, alone or in combination with one or more of the above aspects, the UE is configured to operate in a dual connectivity mode with a primary base station and a secondary base station, and the UE 115 determines a second beam failure event associated with a second failed beam associated with a secondary cell group, transmits a second beam failure recovery request for the secondary cell group, and transmits or receives a second communication in the secondary cell group with a third beam that is different from the failed second beam.

In a sixteenth aspect, alone or in combination with one or more of the above aspects, the beam failure recovery request is transmitted to a primary base station using a first wireless protocol, and wherein the communication is transmitted to or received from a secondary base station using a second wireless protocol different from the first wireless protocol.

In a seventeenth aspect, alone or in combination with one or more of the above aspects, the beam failure recovery request is transmitted to a primary base station using a first frequency range, and wherein the communication is transmitted to or received from a secondary base station using a second frequency range different from the first frequency range, and wherein the second frequency range includes a millimeter wave frequency range.

In an eighteenth aspect, alone or in combination with one or more of the above aspects, the beam failure recovery request includes a MAC CE and is transmitted with at least one other MAC CE, and wherein the beam failure recovery request is transmitted via a Physical Uplink Shared Channel (PUSCH).

In a nineteenth aspect, alone or in combination with one or more of the above aspects, the response to the beam failure event includes a beam failure recovery response or a beam activation command transmitted in response to a MAC CE which includes the information about the second beam (e.g., second beam information).

Accordingly, a UE and a base station may perform Beam Failure Recovery operations and use a new beam prior to confirmation by the base station. By utilizing new beams for a UE after determination of the beam and optionally prior to confirmation by the base station, Beam Failure Recovery operations may be performed more quickly, as compared to conventional Beam Failure Recovery, RACH based Beam Failure Recovery procedures, or both. Thus, latency and overhead are reduced and throughput and reliability are increased.

FIG. 9 is a block diagram illustrating example blocks executed by a base station configured according to an aspect of the present disclosure. The example blocks will also be described with respect to gNB 1100 (or eNB) as illustrated in FIG. 11. FIG. 11 is a block diagram illustrating gNB 1100 configured according to one aspect of the present disclosure. The gNB 1100 includes the structure, hardware, and components as illustrated for gNB 105 of FIG. 2. For example, gNB 1100 includes controller/processor 240, which operates to execute logic or computer instructions stored in memory 242, as well as controlling the components of gNB 1100 that provide the features and functionality of gNB 1100. The gNB 1100, under control of controller/processor 240, transmits and receives signals via wireless radios 1101*a-t* and antennas 234*a-t*. Wireless radios 1101*a-t* includes various components and hardware, as illustrated in FIG. 2 for gNB 105, including modulator/demodulators 232*a-t*, MIMO detector 236, receive processor 238, transmit processor 220, and TX MIMO processor 230. The data 1102-1108 in memory 242 may include or correspond to the data 2102-2108 in memory 282, respectively.

At block 900, a mobile communication device, such as a gNB, may optionally transmit a transmission. A gNB, such as gNB 1100, may generate and transmit a downlink transmission via antennas 234*a-t* and wireless radios 1101*a-t*. The execution environment of transmission logic may define the different transmission processes, such dynamic or periodic transmission processes. Within the execution environment of the transmission logic (and optionally encoder logic), gNB 1100, under control of controller/processor 240, generates and encodes the transmission to be transmitted via antennas 234*a-t* and wireless radios 1101*a-t*.

At block 901, the gNB 1100 receives, from a UE, a beam failure recovery request for a beam failure event associated with a first beam and a secondary cell that serves the UE. The gNB 1100 receives an uplink transmission including a BFRQ via antennas 234*a-t* and wireless radios 1101*a-t*. The gNB 1100 may execute, under control of controller/processor 240, Beam Failure Recovery logic 1102, stored in memory 242. The execution environment of Beam Failure Recovery logic 1102 provides the functionality for gNB 1100 to define and perform the Beam Failure Recovery procedures. In some implementations, the Beam Failure Recovery logic 1102 may identify if MAC CEs are enabled for Beam Failure Recovery procedures, a particular MAC CE configuration, or both.

At block 902, the gNB 1100 may receive a MAC CE from the UE including second beam information and including secondary cell identification information. The gNB 1100 receives a MAC CE via antennas 234a-t and wireless radios 1101a-t. The MAC CE may be received in the same uplink transmission as the BFRQ, that is the same uplink transmission as in block 901, or a different, second uplink transmission. When received with the BFRQ, the uplink transmission may include the MAC CE as a header (such as MAC header) or preamble for an accompanying physical layer signal (such as symbol or waveform) indicating the BFRQ. Alternatively, when received in the second uplink transmission, the MAC CE may be a header (such as MAC header) or preamble for an accompanying second physical layer signal (such as symbol or waveform) or the second uplink transmission may include the MAC CE as payload data, that is indicated by the second physical layer signal.

In some implementations, within the execution environment of the Beam Failure Recovery logic 1102 (and optionally decoder logic), gNB 1100, under control of controller/processor 240, parses the MAC CE to determine serving cell information (such as serving cell identification information), new beam information, or both. In some implementations, the gNB 1100 parses the MAC CE based on configuration information from a capabilities message, a configuration message, or the BFRQ. Additionally, or alternatively, the gNB 1100 parses the MAC CE based on configuration information indicated by the MAC CE, such as one or more indicators (such as configured fields, type fields, joint fields, etc.) thereof.

In other implementations, gNB 1100 does not receive a MAC CE corresponding to the beam failure event or another message which includes the new beam information. In such implementations, the UE may unilaterally or independently use the new beam information and adjusts the beams the UE uses from transmission and reception. Thus, the gNB 1100 and the network do not have to allocate additional resources for beam failure recovery. As an illustrative example, some beam failure events may be caused or alleviated by UE action alone. To illustrate, a UE's location relevant to the gNB 1100 may not change or change to such a degree that the gNB 1100 can still utilized the same beam for reception and transmission. However, blockage near the UE rotation or orientations changes of the UE, a user's grip or hand placement may cause the UE to change beams for reception, transmission, or both.

At block 903, the gNB 1100 transmits a beam failure recovery response in response to receiving the second beam information, the second beam information indicating changed beam communication parameters for the UE in the secondary cell. The gNB 1100 transmits the beam failure recovery response via antennas 234a-t and wireless radios 1101a-t. The beam failure recovery response may be responsive to the second beam information. As explained above, the second beam information may be included in the beam failure recovery request or the MAC CE; the MAC CE may be included with the beam failure recovery request or separate from the beam failure recovery request.

The gNB 1100 may execute additional blocks (or the gNB 1100 may be configured further perform additional operations) in other implementations. For example, the gNB 1100 may transmit a response or acknowledgment message responsive to the BFRQ, the MAC CE, or both, may transmit a second transmission (may transmit a repetition of the failed transmission or a retransmission of the data of the failed transmission sent at block 900), or a combination thereof, after block 902. In other implementations, a MAC CE may not include new beam information.

The base station 105 may execute additional blocks (or the base station 105 may be configured further perform additional operations) in other implementations. For example, the base station 105 may perform one or more operations described above, including such actions as described in FIG. 8 and as attributed to the UE 115. As another example, the base station 105 may perform one or more aspects described below and/or with reference to FIG. 8.

In a first aspect, the UE transmits or receives a communication to or from the secondary cell using a second beam indicated by the second beam information prior to receiving the beam failure recovery response.

In a second aspect, alone or in combination with one or more of the above aspects, prior to transmitting the beam failure recovery response: the base station 105 transmits, based on the beam failure recovery request, an uplink instance for a transmission from the UE for the second beam information, and receives a MAC CE from the UE including the second beam information and identification information of the secondary cell.

In a third aspect, alone or in combination with one or more of the above aspects, the second beam information comprises reference signal information which corresponds to the second beam.

In a fourth aspect, alone or in combination with one or more of the above aspects, the beam failure recovery request comprises a medium access control (MAC) control element (CE) including the second beam information.

In a fifth aspect, alone or in combination with one or more of the above aspects, the beam failure recovery response is a control message including an activation command for the second beam.

In a sixth aspect, alone or in combination with one or more of the above aspects, the beam failure recovery response is an uplink grant scheduling a new transmission for the same Hybrid automatic repeat request (HARM) process ID as a MAC CE which included the second beam information.

In a seventh aspect, alone or in combination with one or more of the above aspects, the beam failure recovery response is transmitted by the base station 105 in a control resource set (CORESET) search space dedicated to beam failure recovery for the secondary cell.

In an eighth aspect, alone or in combination with one or more of the above aspects, the base station 105 scrambles the beam failure recovery response based on a Radio Network Temporary Identifier (RNTI) dedicated to the secondary cell for beam failure recovery.

Accordingly, a UE and a base station may perform Beam Failure Recovery operations and use a new beam prior to confirmation by the base station. By utilizing new beams for a UE after determination of the beam and optionally prior to confirmation by the base station, Beam Failure Recovery operations may be performed more quickly, as compared to conventional Beam Failure Recovery, RACH based Beam Failure Recovery procedures, or both. Thus, latency and overhead are reduced and throughput and reliability are increased.

Although, FIGS. 8 and 9 are directed to implementation where carrier aggregation is used, that is by communication with a secondary serving cell, in other implementations dual connectivity operations may be used. For example, the beam failure event may be for a secondary cell group.

FIG. 10 is a block diagram illustrating example components of a user equipment (UE) according to some implementations of the present disclosure. A UE 1000, such as a UE 115 (see FIG. 2), may have a controller/processor 280, a memory 282, and antennas 252a through 252r, as described above. UE 1000 may also have wireless radios 1001a to 1001r that include additional components also described above with reference to FIG. 2. The memory 282 of UE 1000 stores one or more algorithms that configure processor/controller 280 to carry out one or more procedures as described above with reference to FIGS. 8 and 9.

One or more algorithms stored by memory 282 configure processor/controller 280 to carry out one or more procedures relating to wireless communication by the UE 1000, as previously described. For example, BFR logic 1002 configures controller processor 280 to carry out operations that include determining a beam failure event/recovery in any manner previously described, such as with reference to block 800 (see FIG. 8). Additionally, BFR logic 1002 configures controller processor 280 to carry out operations that include transmitting a beam failure recovery request (BFRQ) in any manner previously described, such as with reference to block 801 (see FIG. 8). Further, new beam information logic 1005 configures controller/processor 280 to carry out operations that include using new beam information to transmit or receive and optionally transmitting new beam information to the network in any manner previously described, such as with reference to block 802 (see FIG. 8).

FIG. 11 is a block diagram illustrating example components of a base station according to some implementations of the present disclosure. A base station 1100, such as a NR-SS base station 105 (see FIG. 2), may have a controller/processor 240, a memory 242, and antennas 234a through 234t, as described above. The base station 1100 may also have wireless radios 1101a to 1101t that include additional components also described above with reference to FIG. 2. The memory 242 of base station 1100 stores one or more algorithms that configure processor/controller 240 to carry out one or more procedures as described above with reference to FIGS. 8 and 9.

One or more algorithms stored by memory 242 configure processor/controller 240 to carry out one or more operations relating to wireless communication by the base station 1100, as previously described. For example, transmission logic configures controller processor 240 to carry out operations that include transmitting data in any manner previously described, such as with reference to block 900 (see FIG. 9). Additionally, BFR logic 1102 configures controller processor 240 to carry out operations that include receiving a beam failure recovery request (BFRQ) in any manner previously described, such as with reference to block 901 (see FIG. 9). Further, MAC CE logic 1103 configures controller processor 240 to carry out operations that include receiving a BFR MAC CE in any manner previously described, such as with reference to block 902 (see FIG. 902).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (such as the functional blocks and modules in FIG. 2) may include processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (such as the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. A person having ordinary skill in the art may implement the described functionality in varying ways for each particular application, but such implementation decisions may not be interpreted as causing a departure from the scope of the present disclosure. A person having ordinary skill in the art will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above may also be included within the scope of computer-readable media.

As used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The previous description of the disclosure is provided to enable a person having ordinary skill in the art to make or use the disclosure. Various modifications to the disclosure will be readily apparent to those having ordinary skill in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a user equipment (UE), comprising:
    transmitting, to a primary cell, a beam failure recovery request associated with a beam failure event associated with a first beam associated with a secondary cell associated with the primary cell;
    selecting, before transmitting the beam failure recovery request, a second beam for communications with the secondary cell;
    transmitting, to the primary cell, a medium access control (MAC) control element (CE) including an indication of the beam failure event and including information about the second beam; and
    receiving, associated with the MAC CE and before receiving a response associated with the beam failure recovery request, a communication from the secondary cell using the second beam.

2. The method of claim 1, wherein the response comprises a beam failure recovery response, respectively, in response to the MAC CE, and wherein the MAC CE further includes identification information associated with the secondary cell.

3. The method of claim 1, wherein the information about the second beam comprises reference signal information associated with the second beam.

4. The method of claim 3, wherein the reference signal information includes a synchronization signal block (SSB) identifier or a channel state information reference signal (CSI-RS) identifier.

5. The method of claim 1, wherein the communication is a control channel transmission or a data channel transmission.

6. The method of claim 1, wherein the second beam is used for control resource set (CORESET) transmissions, Physical Uplink Control Channel (PUCCH) transmissions, Physical Uplink Shared Channel (PUSCH) transmissions, Physical Downlink Shared Channel (PDSCH) transmissions, Physical Downlink Control Channel (PDCCH) transmissions, sounding reference signal (SRS) transmissions, or a combination of one or more of the CORESET transmissions, the PUCCH transmissions, the PUSCH transmissions, the PDSCH transmissions, the PDCCH transmissions, and the SRS transmissions for the secondary cell.

7. An apparatus configured for wireless communication, the apparatus comprising:
    at least one processor; and
    a memory coupled to the processor, the processor is configured to:
        transmit, to a primary cell, a beam failure recovery request associated with a beam failure event associated with a first beam associated with a secondary cell associated with the primary cell;
        select, before transmitting the beam failure recovery request, a second beam for communications with the secondary cell;
        transmit, to the primary cell, a medium access control (MAC) control element (CE) including an indication of the beam failure event and including information about the second beam; and
        receive, associated with the MAC CE and before receiving a response associated with the beam failure recovery request, a communication from the secondary cell using the second beam.

8. The apparatus of claim 7, wherein the processor is further configured:
    to determine second beam information of the second beam, and wherein the second beam information includes beamforming information associated with the second beam.

9. The apparatus of claim 8, wherein the beamforming information includes phase information and amplitude information associated with antenna elements of an antenna array that generates the second beam, or the beamforming information includes information on a main direction of signal propagation.

10. The apparatus of claim 8, wherein the beamforming information identifies a particular beam in a codebook that includes a plurality of beams.

11. The apparatus of claim 7, wherein the apparatus is configured to operate in a dual connectivity mode with a primary base station corresponding to the primary cell and a secondary base station corresponding to the secondary cell, and wherein the processor is further configured:
    to determine a second beam failure event associated with a third beam associated with a secondary cell group;
    to transmit a second beam failure recovery request for the secondary cell group; and
    to transmit or receive a second transmission in the secondary cell group with a fourth beam that is different from the third beam.

12. The apparatus of claim 7, wherein the beam failure recovery request is transmitted to a primary base station corresponding to the primary cell using a first wireless protocol, and wherein the communication is received from a secondary base station corresponding to the secondary cell using a second wireless protocol different from the first wireless protocol.

13. The apparatus of claim 7, wherein the beam failure recovery request is transmitted to a primary base station corresponding to the primary cell using a first frequency range, and wherein the communication is received from a secondary base station corresponding to the secondary cell using a second frequency range different from the first frequency range, and wherein the second frequency range includes a millimeter wave frequency range.

14. The apparatus of claim 7, wherein the beam failure recovery request is transmitted via a Physical Uplink Shared Channel (PUSCH).

15. The method of claim 1, wherein the MAC CE further includes identification information of the secondary cell associated with the beam failure event, and wherein the identification information of the secondary cell comprises a secondary cell identifier (ID) index or listing.

16. The method of claim 15, wherein the information about the second beam comprises a synchronization signal block (SSB) identifier or a channel state information reference signal (CSI-RS) identifier which corresponds to the second beam.

17. The method of claim 1, wherein the beam failure recovery request corresponds to a scheduling request, and wherein the scheduling request indicates a request for an uplink resource for transmitting the MAC CE.

18. The method of claim 1, wherein the communication is a Physical Downlink Control Channel (PDCCH) transmission, and further comprising:
transmitting, associated with the MAC CE, a Physical Uplink Control Channel (PUCCH) transmission to the secondary cell using the second beam.

19. The apparatus of claim 7, wherein the MAC CE further includes identification information of the secondary cell associated with the beam failure event, and wherein the identification information of the secondary cell comprises a secondary cell identifier (ID) index or listing.

20. The apparatus of claim 19, wherein the information about the second beam comprises a synchronization signal block (SSB) identifier or a channel state information reference signal (CSI-RS) identifier which corresponds to the second beam.

21. The apparatus of claim 7, wherein the beam failure recovery request corresponds to a scheduling request, and wherein the scheduling request indicates a request for an uplink resource for transmitting the MAC CE.

22. The apparatus of claim 7, wherein the communication is a Physical Downlink Control Channel (PDCCH) transmission, and wherein the processor is further configured:
to transmit, associated with the MAC CE, a Physical Uplink Control Channel (PUCCH) transmission to the secondary cell using the second beam.

23. The method of claim 1, wherein the MAC CE includes a second indication of a second beam failure event associated with another secondary cell.

* * * * *